UNITED STATES PATENT OFFICE.

GEORGE N. SAEGMULLER, OF ROCHESTER, NEW YORK, ASSIGNOR, BY DIRECT AND MESNE ASSIGNMENTS, OF ONE-HALF TO BAUSCH, LOMB, SAEGMULLER COMPANY, OF ROCHESTER, NEW YORK, A CORPORATION OF NEW YORK, AND ONE-HALF TO J. L. LATIMER, OF THE UNITED STATES NAVY.

TELESCOPE.

No. 828,511.     Specification of Letters Patent.     Patented Aug. 14, 1906.

Application filed July 1, 1905. Serial No. 267,946.

*To all whom it may concern:*

Be it known that I, GEORGE N. SAEGMULLER, a citizen of the United States, residing at Rochester, in the county of Monroe, State of New York, have invented certain new and useful Improvements in Telescopes, of which the following is a specification, reference being had therein to the accompanying drawings.

This invention relates to a telescope, and particularly to an instrument of that character intended for gun-sighting purposes.

The invention has for an object to provide a telescope composed of a plurality of tubes of different relative power adapted to be focused upon the same object, whereby the object will remain in the field of the tube of lower power when owing to its movement it has passed beyond the field of higher power. This is particularly important in gun-sighting where either the target or the vessel is moving, as the high-power tube having only a relatively small field completely loses the target during such movement, while the low-power tube having a much larger field retains within its area the target, so that the operator is enabled to accurately judge the position of the target and to anticipate its entrance into the high-power field by which it may be more clearly defined and at which time it is often desirable to fire the ordnance being aimed at the target. While these two tubes coöperate with each other, still they may be separately used—for instance, under conditions where an object nearer is to be momentarily viewed, as well as one at a greater distance.

A further object of the invention is to illuminate the cross lines or wires by which the object or target is accurately sighted within the telescope. This illumination is necessary when there is not sufficient light entering the tube of the telescope to fully illuminate these lines and render them clearly apparent upon the object sighted, for instance, on dull days or during night-sighting. It is therefore important that the light be governed in degree and power so as to be only sufficient for the illumination of the lines and not such as to obscure the image upon the lens, and for such reason it is important and desirable to provide between the illuminating means and the lens carrying the cross-lines a screen or shutter by which the degree of light may be governed and controlled in accordance with the conditions necessary for each use of the instrument.

Other and further objects and advantages of the invention will be hereinafter set forth and the novel features thereof defined by the appended claims.

Figure 1:
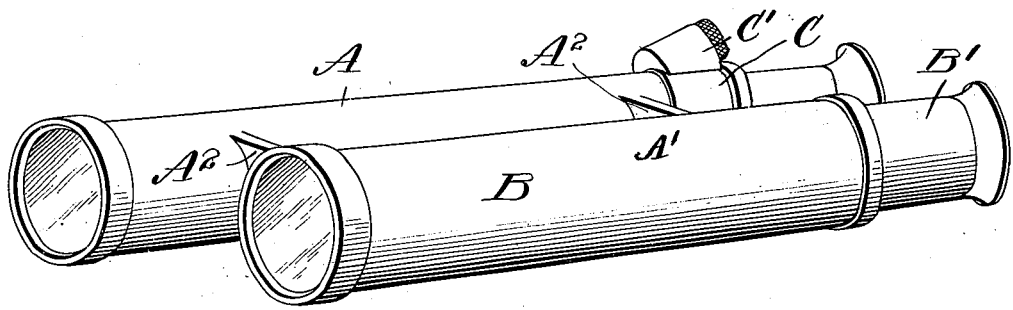
Figure 2:
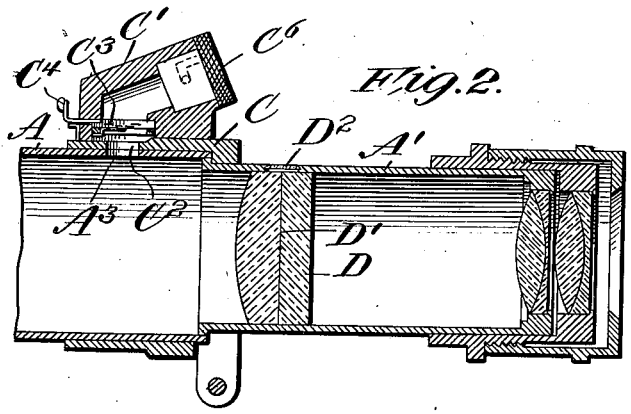
Figure 4:
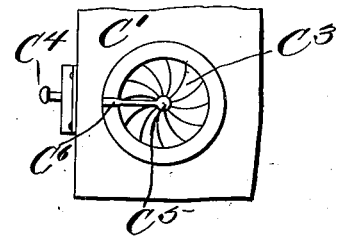
Figure 3:
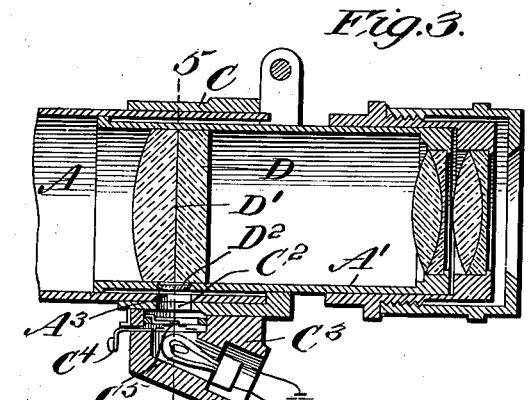

In the drawings, Figure 1 is a perspective of the telescope; Fig. 2, a detail horizontal section through a portion thereof with the eyepiece withdrawn for high power in a variable-power telescope; Fig. 3, a similar view with the eyepiece compressed for use with the illuminating means and low power; Fig. 4, a detail of the shutter; and Fig. 5 a vertical cross-section on the line 5 5 of Fig. 3.

Like letters of reference refer to like parts in the several figures of the drawings.

The letter A designates a telescopic tube provided with the usual lenses which may be all of either constant or variable power—for instance, of high power with a small field—while B indicates a similar tube, in which the arrangement of lenses produces a low power with a large field, each of these tubes being provided with the usual telescoping eyepieces A' and B' and connected together in any desired manner common in binocular glasses—for instance, a bridge-wall $A^2$. This combination of the tubes of different powers and fields adapted to be focused upon a common object causes one to act constantly as a finder having a field of larger power than its associate member, by which a more definite image of the object is obtained. In the illumination of these telescopic tubes an aperture $A^3$ is preferably provided in the body of the tube over which a suitable plate C is disposed, carrying a casing C' of any desirable or suitable shape, having an aperture $C^2$ in alinement with the aperture $A^3$ and with the space within the casing. Adjacent to these apertures a diaphragm or shutter $C^3$ of any desired character is used For instance, an iris diaphragm of the construction commonly used is inserted in this position and adapted to be operated by a handpiece $C^4$, extended beyond the casing. In the use of a diaphragm or shutter of this character there is always a small opening at the central meeting-point of the leaves thereof, and to prevent the entrance of light from this point a screen $C^5$ is disposed within the casing by means of an arm $C^6$ and lies over this central point, as shown in Fig. 4. By these means the degree or amount of light to be projected upon the lens carrying the cross-lines is governed and controlled contingent upon the amount of light transmitted from the object or target viewed.

Figure 5:
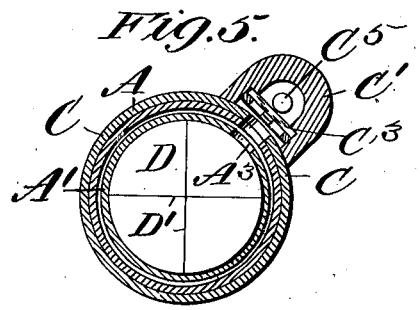

This invention is shown in Figs. 2 and 3 as applied to a variable-power telescope, in which the lens D carrying the cross-lines $D'$ is mounted in the eyepiece $A'$, carrying any ordinary or convenient arrangement of lenses, and when this eyepiece is extended for use with high power a transparent plate $D^2$ is inserted in the side wall of the tube thereof opposite the lines, so as to permit the entrance of light upon these lines, and when the tube is compressed or telescoped for low power or for night-sighting this transparent plate is brought opposite the apertures $A^3$ and $C^2$, so that the light transmitted from the lamp $C^5$, disposed within the casing, passes through the plate $D^2$ and illuminates the lines, the degree of illumination being controlled by the shutter $C^3$. It is also important in the illumination of these lines that the light be disposed at an angle of forty-five degrees to either of the lines, so as to strike both lines, as shown in Fig. 5, as if disposed in alinement with either line the opposite cross-line will not be properly illuminated.

While I have shown an electric lamp used in connection with the invention, any other desired form thereof may be used as found convenient. When the illuminating means is removed from the casing, a cap $C^6$ may be applied thereto, as shown in Fig. 2.

Having described my invention, what I claim, and desire to secure by Letters Patent, is—

1. A compound telescope comprising two independent adjustable telescopes each fixedly arranged in parallelism with the other and of different power and area of field from the other, cross-lines provided in the telescope of lower power, and means for artificially illuminating said cross-lines.

2. In a telescope, a tube provided with finder-lines therein, a casing secured thereto and adapted to receive an illuminating means, and a shutter disposed between the casing and finder-lines.

3. In a telescope, a tube provided with finder-lines therein, a casing secured thereto and adapted to receive an illuminating means, and an adjustable shutter disposed within said casing to control the degree of light upon said finder-lines.

4. In a telescope, a tube provided with finder-lines therein, a casing secured thereto and adapted to receive an illuminating means, an adjustable shutter disposed within said casing to control the degree of light upon said finder-lines, and a screen supported at the center of said shutter.

5. In a telescope, cross-lines carried by a lens therein, a casing disposed upon the tube of said telescope and communicating with an opening therein disposed at an angle of forty-five degrees to said lines, and means for illuminating said lines in the plane thereof.

6. In a telescope, an eyepiece-tube provided with a lens having cross-lines thereon, and an opening at the edge of said lens, a casing surrounding said opening, and artificial illuminating means disposed in said casing in the plane of the cross-lines to illuminate the same.

7. In a telescope, an eyepiece-tube provided with a lens having cross-lines thereon, a transparent plate disposed in the tube of said eyepiece to illuminate said lines, a telescoping tube provided with an aperture adapted to be brought into alinement with said transparent plate, a casing secured in alinement with said aperture, and means for illuminating said casing.

8. In a telescope, an eyepiece-tube provided with a lens having cross-lines thereon, a transparent plate disposed in the tube of said eyepiece to illuminate said lines, a telescoping tube provided with an aperture adapted to be brought into alignment with said transparent plate, a casing secured in alinement with said aperture, means for illuminating said casing, and an adjustable diaphragm disposed within the casing opposite the aperture therein.

9. In a telescope, a tube provided with a lens having cross-lines thereon and an opening in its side wall in the plane of said lens, a casing adapted to receive artificial illuminating means and surrounding said opening, and a closure for the open portion of said casing to prevent the entrance of light therethrough to said lines.

In testimony whereof I affix my signature in presence of two witnesses.

GEORGE N. SAEGMULLER.

Witnesses:
WM. L. PATTERSON,
A. O. POTTER.